United States Patent
Chang

(10) Patent No.: US 8,074,079 B2
(45) Date of Patent: Dec. 6, 2011

(54) ANTI-ATTACKING METHOD FOR PRIVATE KEY, CONTROLLER, STORAGE DEVICE AND COMPUTER READABLE RECORDING MEDIUM HAVING THE SAME

(75) Inventor: Ching-Wen Chang, Hsinchu (TW)

(73) Assignee: Phison Electronics Corp., Miaoli (TW)

( * ) Notice: Subject to any disclaimer, the term of this patent is extended or adjusted under 35 U.S.C. 154(b) by 789 days.

(21) Appl. No.: 12/043,012

(22) Filed: Mar. 5, 2008

(65) Prior Publication Data

US 2009/0150684 A1   Jun. 11, 2009

(30) Foreign Application Priority Data

Dec. 10, 2007   (TW) ................................ 96147026 A

(51) Int. Cl.
*G06F 11/08* (2006.01)
*G06F 11/16* (2006.01)
(52) U.S. Cl. .................................................... 713/193
(58) Field of Classification Search .................... 713/193
See application file for complete search history.

(56) References Cited

U.S. PATENT DOCUMENTS

| | | | | |
|---|---|---|---|---|
| 5,224,160 A | * | 6/1993 | Paulini et al. ................. | 713/187 |
| 6,052,797 A | * | 4/2000 | Ofek et al. ........................ | 714/6 |
| 6,959,091 B1 | * | 10/2005 | Sabin ............................. | 380/286 |
| 7,596,570 B1 | * | 9/2009 | Emigh et al. .......................... | 1/1 |
| 7,660,957 B2 | * | 2/2010 | Hirakawa et al. ............... | 711/162 |
| 2002/0095602 A1 | * | 7/2002 | Pherson et al. ................. | 713/201 |
| 2003/0028726 A1 | * | 2/2003 | Gaertner et al. ............... | 711/114 |
| 2008/0141043 A1 | * | 6/2008 | Flynn et al. .................... | 713/193 |

OTHER PUBLICATIONS

Gopalan Sivathanu, Charles P. Wright, Erez Zadok; "Ensuring data integrity in storage: techniques and applications," Proceedings of the 2005 ACM workshop on Storage security and survivability, Nov. 11-11, 2005.*

* cited by examiner

Primary Examiner — Carl Colin
Assistant Examiner — S. Ali Zaidi
(74) Attorney, Agent, or Firm — J.C. Patents

(57) ABSTRACT

An anti-attacking method for a private key is provided. The method includes using a plurality of storage areas for storing the same security information. The method also includes selecting one of the storage areas as a currently-used storage area for accessing the security information and synchronously updating the security information stored in the other storage areas while updating the security information stored in the currently-used used storage area when generating a digital signature by using a signature rule and the private key. The method further includes selecting one of the other storage areas as the currently-used storage area for correctly accessing the security information when detecting an attack on the security information stored in the currently-used storage area during generation of the digital signature. Therefore, it is possible to prevent the attacker from stealing the private key.

21 Claims, 5 Drawing Sheets

ANTI-ATTACKING METHOD FOR PRIVATE KEY, CONTROLLER, STORAGE DEVICE AND COMPUTER READABLE RECORDING MEDIUM HAVING THE SAME

CROSS-REFERENCE TO RELATED APPLICATION

This application claims the priority benefit of Taiwan application serial no. 96147026, filed on Dec. 10, 2007. The entirety of the above-mentioned patent application is hereby incorporated by reference herein and made a part of this specification.

BACKGROUND OF THE INVENTION

1. Field of the Invention

The present invention is related to a protection method for a private key and particularly to an anti-attacking method for an RSA private key, a controller and a storage device executing the method and a computer readable recording medium thereof.

2. Description of Related Art

In a cryptosystem, a code key is applied in relevant computations related to cryptography. As to an asymmetrical cryptosystem Rivest-Shamir-Adleman (RSA), a code key thereof is produced in a pair of a public key and a private key. Usage of "a pair of a public key and a private key" defines two applications. One application is using the private key as a signature key to produce a digital signature on digital information and using the public key as a verifying key to verify if a certain value is a correct signature value. The other application is using the public key as an encrypted key to encrypt a plain text as an encrypted text and using the private key as a decrypting key to decrypt the encrypted text back to the plain text.

A person who executes a digital signature has to keep secrecy of his/her signature key, and a receiver of an encrypted text also has to keep the decrypting key as a secret. Therefore, the private key is a secret. Although the private key is a value related to the public key, disclosure of the public key does not divulge secrecy of the corresponding private key.

In an RSA method, the modular arithmetic is used, wherein a modulus in the modular arithmetic is multiplication of two prime numbers. It is rather difficult to derive a private key from a public key using computation for lack of an efficient algorithm to factorize a multiplication of two prime numbers back to the two original prime numbers.

RSA computation usually involves the modular arithmetic. Modular arithmetic can be defined as follows: Suppose x and y are two integers, when (x-y) can be divisible by z, x and y are called as identical remainders of z as the modulus of modular arithmetic, which is expressed as x-y (mod z).

An RSA key may be produced by following steps:

(1) A positive integer e is selected as an encryption exponent, i.e., a public exponent well-known to people skilled in the art.

(2) Two different prime numbers p and q are selected at random, and both (p−1) and (q−1) are primer numbers with e respectively.

(3) A public modulus is set as n=pq.

(4) A private exponent d is selected to render (de−1) as divisible by both (p−1) and (q−1).

A public exponent e and a modulus n of RSA are used to encrypt a plain text integer m. An encrypted integer c is obtained by calculating $c \propto m^e$(mod n), wherein m is presumed to be smaller than n. A private exponent d and a modulus n are used to decrypt the encrypted integer c back to the plain integer m through calculating $m \equiv c^d$(mod n).

The private exponent d and the modulus n in RSA may also be applied in generating a digital signature. First, a message summary for digital information M to be signatured, expressed as hash(M), is generated through a collision-resistant hash function. Next, a digital signature of the digital information M may be obtained through hash$(M)^d$(mod n), which is expressed as signature (M).

The public exponent e and the modulus n in RSA may be used to verify whether a certain value is a correct digital signature. Suppose a verifier receives an M||SGN, M represents a digital information and SGN represents a digital signature attached to M. First, the verifier uses the already selected collision-resistant hash function to calculate hash (M) and uses a public key (e,n) to decrypt SGN through calculating SGN$^e$(mod n). Next, the verifier compares hash (M) with the decrypted result. If the comparison reveals both to be identical to each other, SGN is a correct signature. A general framework for implementing RSA is, for example, an RSA Rule 1:

```
0.1  Input : M, K, N
0.2  Output : R = M^K mod N
0.3  R = 1, B = M
0.4  for i = 0 to length (K)−1,
0.5      if (K_i == 1) R = RB mod N
0.6      B = B^2 mod N
0.7  end for
```

In the aforementioned Rule 1, a document R bearing a digital signature is outputted through inputting a document M to which a digital signature is added, an RSA private key K and an RSA modulus N. R and B are security information during operation of RSA. Furthermore, K is 1024 or 2048 bits.

Since the said private key K may be applied in an internet transaction or a smart card which requires identity verification, it has become an object hackers are keen to break. Under such a framework, generally, before a digital signature is outputted, a cryptosystem would verify a digital signature with a public key and only output a computation result when the verification is successful. Accordingly, an attacker intending to steal an RSA private key may perform a fault attack on R of the said formula (0.5) or on B of the said formula (0.6) so as to steal the private key. In other words, the attacker may tamper values of R or B during an operation process to guess the RSA private key K. The following is an attacking method exemplified by tampering R. An implementation framework of modulus multiplication in the formula (0.5) is stated as follows:

```
1.1  Input: R, M, N
1.2  Output: R = RM mod N
```

1.3  Suppose: $R = \sum_{j=0}^{m-1} R_j(2^t)^j$, m = ⌈n/t⌉, n = length(R)

```
1.4  A = 0
1.5  for j = m − 1 to 0,
1.6      A = (A2^t + R_j M) mod N
1.7  end for
1.8  R = A
```

It can be known from the said formula (1.5) that in modulus multiplication, a security information R is calculated bit by bit and updated accordingly. If the said formula (1.6) executes j=k<m−1, the attacker attacks (modifies) information $R_{m-1}$, $R_{m-2}$, ..., $R_{k+1}$. Since the attacker modifies information already calculated, such modification does not result in an erroneous final value A. Therefore, when executing the formula (1.8) at last, modulus multiplication can still obtain a correct R. It is known from the formula (0.5) that if $K_i=1$, a final computation result is identical to the correct value. On the contrary, if $K_i=0$, modulus multiplication is not performed, and an attack by the attack would render R as different from the correct value thereof. Hence, if a final operation result of Rule 1 is found to be erroneous, the attacker may infer that the RSA private key $K_j$ is 0. If the operation result is correct, the attacker may infer that the RSA private key $K_j$ is 1.

A general anti-attacking mechanism usually detects an attack as described above before a result is outputted by verifying a computation result with a public key to determine whether to output the result. However, such an approach may detect an attack but cannot ward off the attack since no result is outputted during the attack is also advising the attacker that the operation result is erroneous.

Therefore, an anti-attacking method which prevents an attacker from inferring a private key is necessary to solve the said problem.

SUMMARY OF THE INVENTION

The present invention is directed to an anti-attacking method for a private key, a controller which executes the anti-attacking method for the private key, a storage device with the controller and a computer readable recording medium storing a computer program used for executing the anti-attacking method for the private key. The anti-attacking method effectively prevents an attacker from stealing the private key.

The present invention provides an anti-attacking method for a private key. The anti-attacking method includes using a plurality of storage areas to store an identical security information respectively. The anti-attacking method further includes selecting one of the storage areas as a currently-used storage area to access the security information and update the security information in the currently-used storage area and synchronously update the security information stored in the other storage areas when a signature rule and a private key are used to generate a digital signature. The anti-attacking method further includes selecting another storage area as the currently-used storage area when the security information in the currently-used storage area is attacked so as to provide the correct security information and store the updated security information.

The present invention provides a controller suitable for use in a storage device. The controller includes a non-volatile memory interface, a buffer memory and a microprocessor unit. The non-volatile memory interface is used for accessing a non-volatile memory. The buffer memory is used for storing data temporarily. The microprocessor unit is electrically connected to the non-volatile memory interface and the buffer memory, and uses a plurality of storage areas to store an identical security information respectively. The microprocessor unit selects one of the storage areas as a currently-used storage area to access the security information when a signature rule and a private key are used to generate a digital signature, and synchronously updating the security information stored in the other storage areas when the security information in the currently-used storage area is updated. The microprocessor unit selects another storage area as the currently-used storage area when the security information in the currently-used storage area is attacked so as to provide the correct security information and store the updated security information.

The present invention provides a storage device including a non-volatile memory, a controller and a data transmission interface. The non-volatile memory is used for storing data. The controller is electrically connected to the non-volatile memory. The data transmission interface is electrically connected to the controller and used for communicating with a host. The controller includes a non-volatile memory interface, a buffer memory and a microprocessor unit. The non-volatile memory interface is used for accessing the non-volatile memory. The buffer memory is used for storing data temporarily. The microprocessor unit uses a plurality of storage areas to store an identical security information respectively. The microprocessor unit selects one of the storage areas as a currently-used storage area to access the security information when a signature rule and a private key are used to generate a digital signature, and synchronously update the security information stored in the other storage areas when the security information in the currently-used storage area is updated. The microprocessor unit selects another storage area as the currently-used storage area when the security information in the currently-used storage area is attacked so as to provide the correct security information and store the updated security information.

In the present invention, a plurality of storage areas are used to store a value of the security information, and thus safety of the signature rule is enhanced and an attacker is prevented from stealing the private key.

In order to make the aforementioned and other objects, features and advantages of the present invention more comprehensible, preferred embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1A:
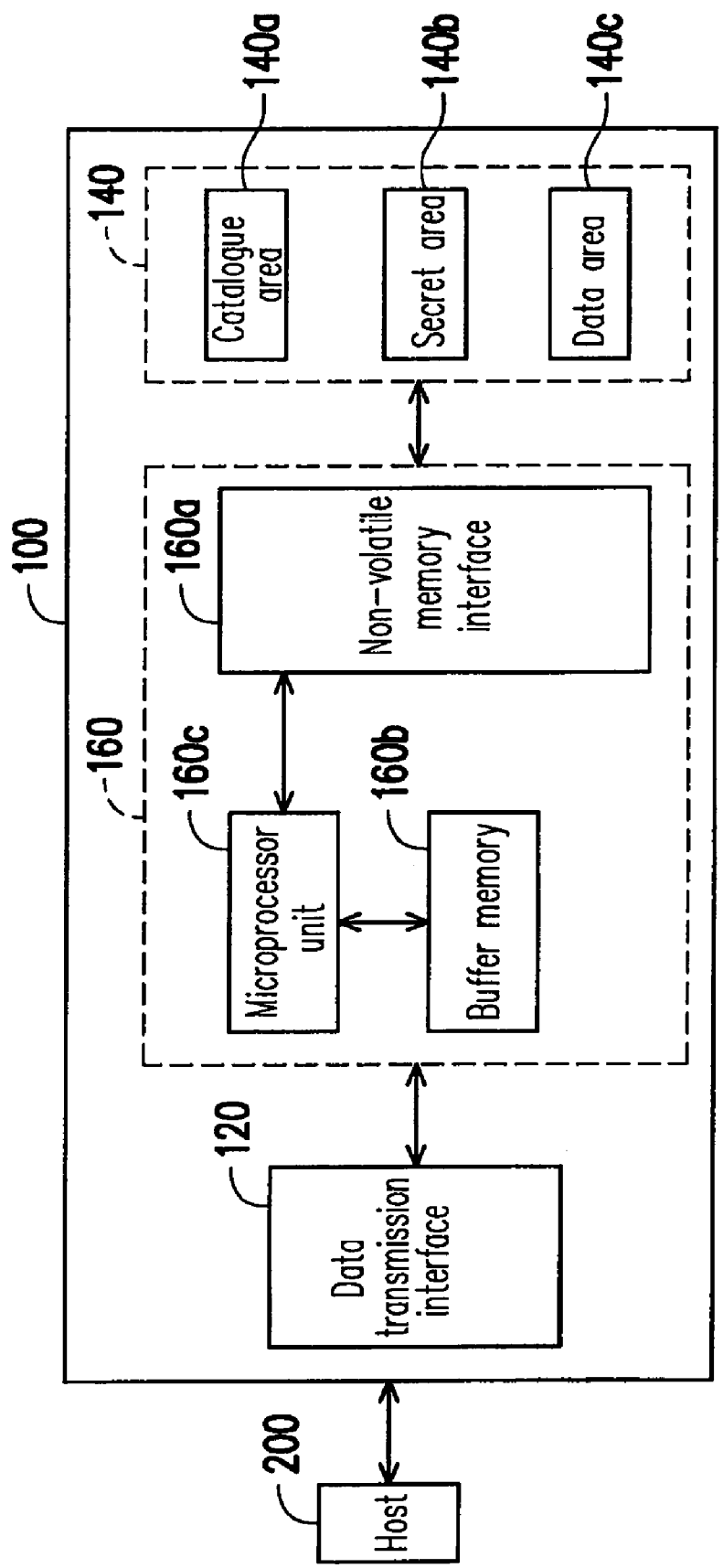
FIG. 1A is a schematic block diagram illustrating a storage device having a verification mechanism according to an embodiment of the present invention.

FIG. 1A is a schematic block diagram illustrating a storage device having a verification mechanism according to an embodiment of the present invention.

Referring to FIG. 1A, a storage device 100 includes a data transmission interface 120, a non-volatile memory 140 and a controller 160.

The data transmission interface 120 is electrically connected to the controller 160 and used for communicating with a host 200. In other words, the host 200 may access the storage device 100 through the data transmission interface 120. More specifically, the host 200 may store data in the non-volatile memory 140 of the storage device 100 through the data transmission interface 120. Or, the host 200 may read the data stored in the non-volatile memory 140 of the storage device 100 through the data transmission interface 120. The data transmission interface 120 may be a USB interface, an IEEE 1394 interface, an SATA interface, a PCI Express interface, an MS interface, an MMC interface, an SD interface, a CF interface or an IDE interface.

The non-volatile memory 140 is electrically connected to the controller 160 and used for storing data. For example, the non-volatile memory 140 includes a catalogue area 140a, a secret area 140b and a data area 140c. A private key adopted by a verification mechanism is stored in the secret area 140b. In the present embodiment, the non-volatile memory 140 is a flash memory. In more detail, the non-volatile memory 140 is a multi-layer cell (MLC) NAND flash memory. It must be understood that the present invention is not limited to this. For example, the non-volatile memory 140 may also be a single-level cell (SLC) NAND flash memory.

The controller 160 is used for controlling overall operation between the data transmission interface 120 and the non-volatile memory 140, such as storage, reading and erasing of data. The controller 160 includes a non-volatile memory interface 160a, a buffer memory 160b and a microprocessor unit 160c.

The non-volatile memory interface 160a is used for converting the data which the host 200 intends to write into a format acceptable for the non-volatile memory 140 through the non-volatile memory interface 160a.

The buffer memory 160b is used for temporarily storing system data (such as a look up table) or the data which the host reads or writes. In the present embodiment, the buffer memory 160b is a static random access memory (SRAM). However, it is to be understood that the present invention is not limited to this. A dynamic random access memory (DRAM), an MRAM, a PRAM or other suitable memories may also be applied in the present invention.

The microprocessor unit 160c is used for controlling overall operation of the controller 100. The microprocessor unit 160c executes a signature rule and an anti-attacking method according to an embodiment of the present invention to protect the private key. A detailed description of the anti-attacking method is provided in the following.

Figure 1B:
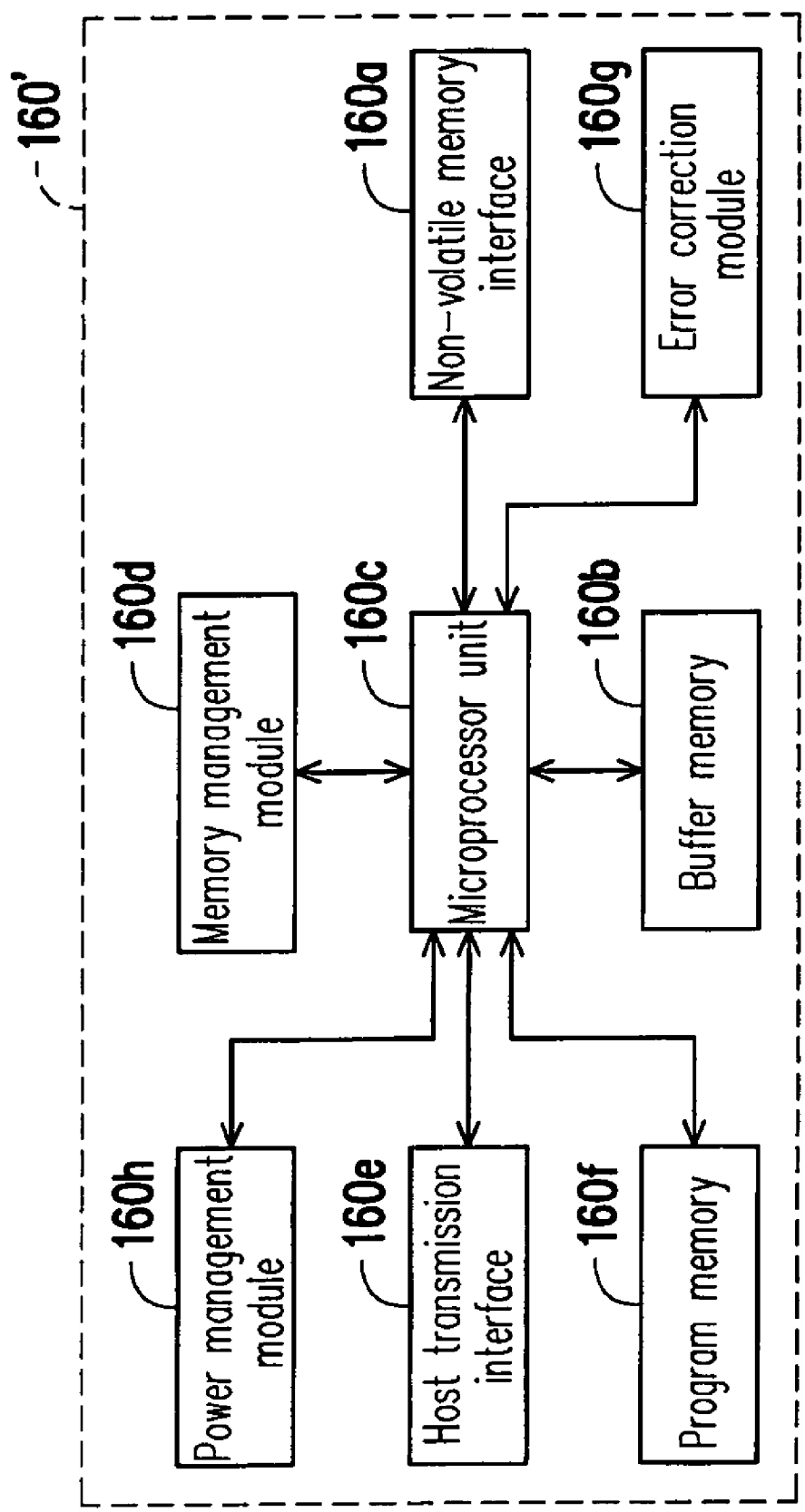
FIG. 1B is a schematic block diagram illustrating a storage device having a verification mechanism according to another embodiment of the present invention.

According to another embodiment of the present invention, the controller 160 further includes a memory management module 160d, a host transmission interface 160e, a program memory 160f, an error correction module 160g and a power management module 160h (illustrated as 160' in FIG. 1B). Wherein the memory management module 160d, the error correction module 160g and a power management module 160h could be implemented by software, firmware or hardware.

The memory management module 160d is used for managing the non-volatile memory 140, such as executing a wear leveling process, managing damaged blocks and maintaining a mapping table.

The host transmission interface 160e is used for communicating with the host 200. The host transmission interface 160e may be a USB interface, an IEEE 1394 interface, an SATA interface, a PCI Express interface, an MS interface, an MMC interface, an SD interface, a CF interface or an IDE interface to correspond with the data transmission interface 120 of the storage device 100.

The program memory 160f is used for storing program codes executed by the controller 160 to control the storage device 100. The error correction module 160g is used for calculating an error correcting code to check and correct data which the host reads or writes.

The power management module 160h is used for managing a power of the storage device 100.

Figure 1C:
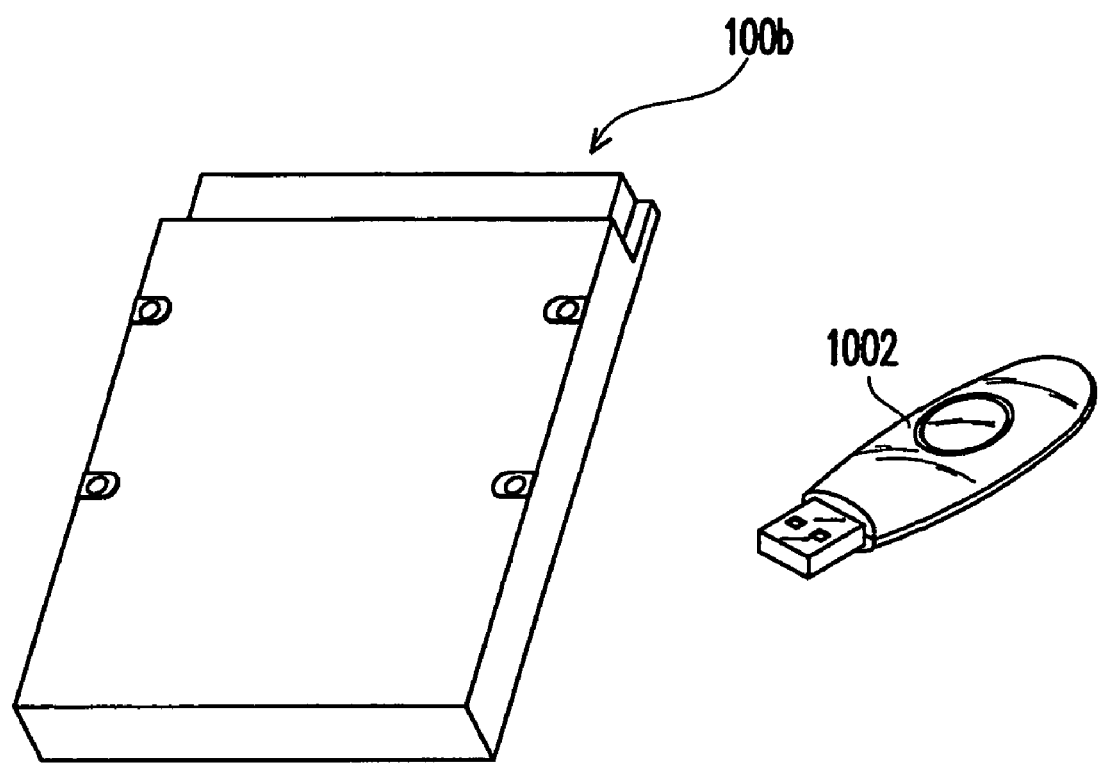
FIG. 1C is an example of a storage device according to an embodiment of the present invention.
Figure 1C:
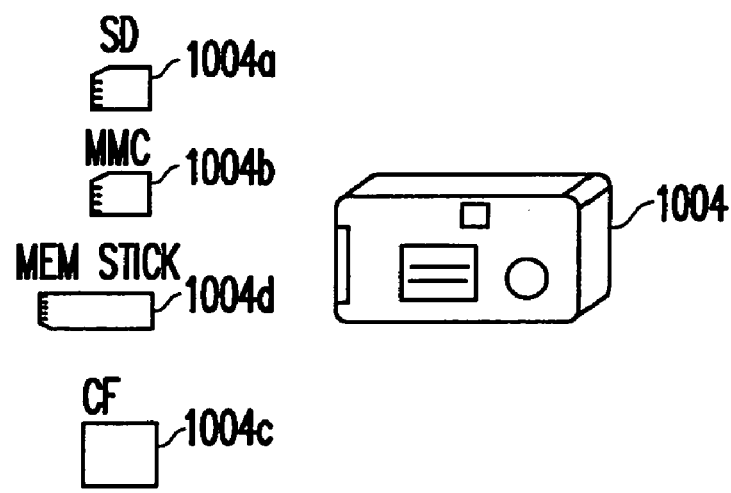

In the present embodiment, the storage device 100 is a flash memory storage medium. Nevertheless, it is to be understood that the present invention is not limited to this. The storage device may also be a USB flash disk 1002, an SD card 1004a, an MMC card 1004b, a CF card 1004c and a memory stick 1004d, for example, used by a digital camera (camcorder) 1004, and a solid hard disk drive 1006 (as illustrated in FIG. 1C).

In the present embodiment, a storage device mainly featured by its function of storing data is described. However, according to another embodiment of the present invention, the storage device may also be a smart card (not illustrated) mainly used for verification, wherein the data transmission interface may be a smart card interface compatible with ISO 7816.

Figure 2:
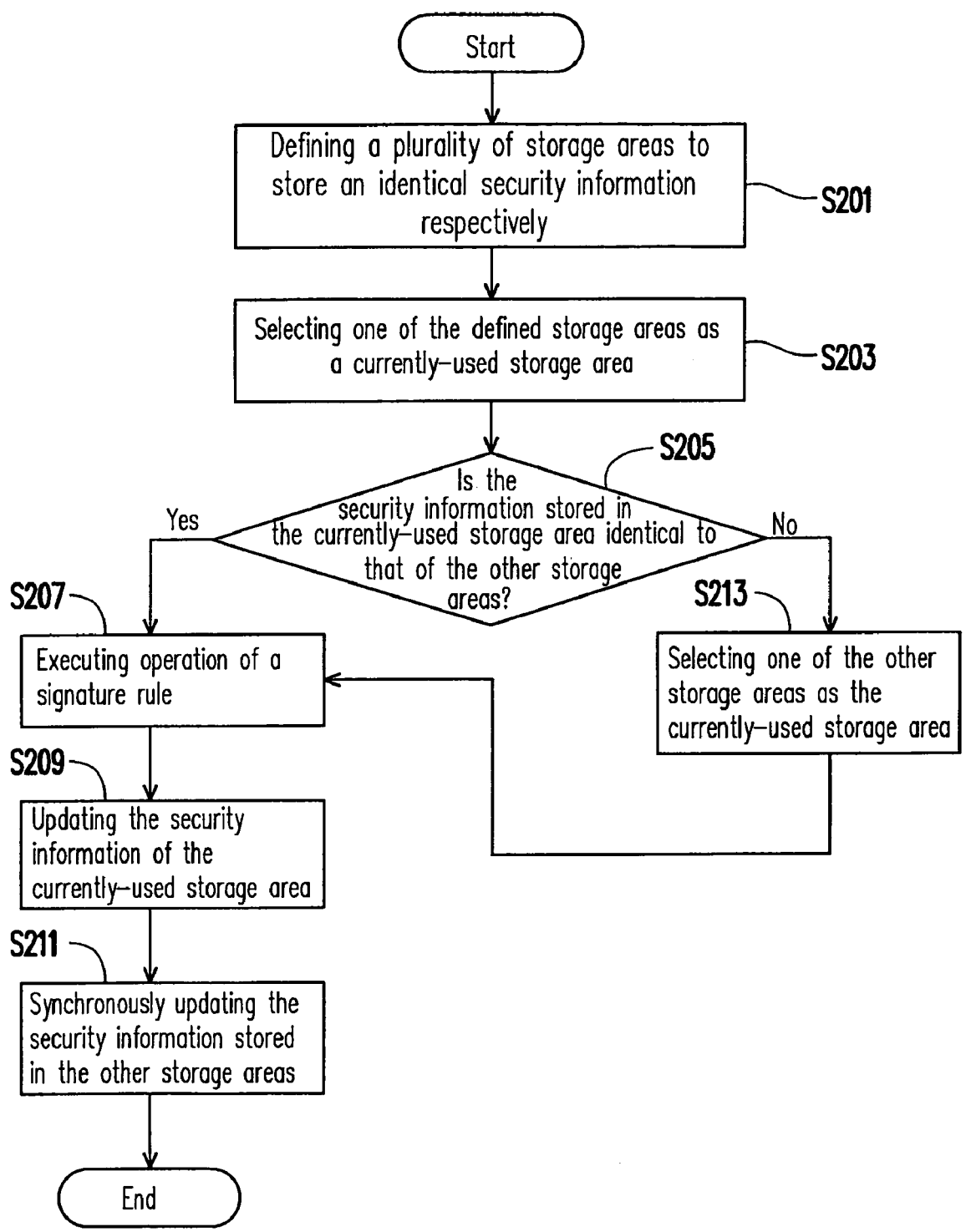
FIG. 2 is a flowchart illustrating an anti-attacking method for a private key according to an embodiment of the present invention.

FIG. 2 is a flowchart illustrating an anti-attacking method for a private key according to an embodiment of the present invention.

Referring to FIGS. 2 and 1A, in a step S201, a plurality of storage areas is defined in the buffer memory 160b to store an identical security information respectively. Generally, when a private key is used to execute operating of a signature rule, a digital signature can be generated for a document. The security information herein refers to an operation information generated during operation of the signature rule and thereby generates a digital signature at last.

During generation of the digital signature, an attacker intending to steal the private key may tamper the security information and infer the private key from a final operation result of the signature rule. In the present embodiment, the anti-attacking method makes back-up copies of the security information in a plurality of storage areas synchronously. The purpose is to continue operation with the correct security information when under attack.

In a step S203, one of the defined storage areas is selected as a currently-used storage area. The currently-used storage area herein refers to the storage area used for accessing the security information during operation of the signature rule. In a step S205, it is determined whether the security information stored in the currently-used storage area is identical to that stored in the other storage areas. If in the step S205, the security information stored in the currently-used storage area is determined as identical to that stored in the other storage areas, the operation of the signature rule is executed in a step S207. Afterwards, in a step S209, the security information of the currently-used storage area is updated, and in a step S211, the security information stored in the other storage areas is synchronously updated.

In the step S205, if the security information stored in the currently-used storage area is determined as different from that stored in the other storage areas (that is, under attack), in a step S213, one of the other storage areas besides the currently-used storage area is selected as the currently-used storage area to further execute the step S207.

According to another embodiment of the present embodiment, the step S213 further includes updating the security information of the storage area under attack with the security information of the other storage areas not under attack.

Figure 3:
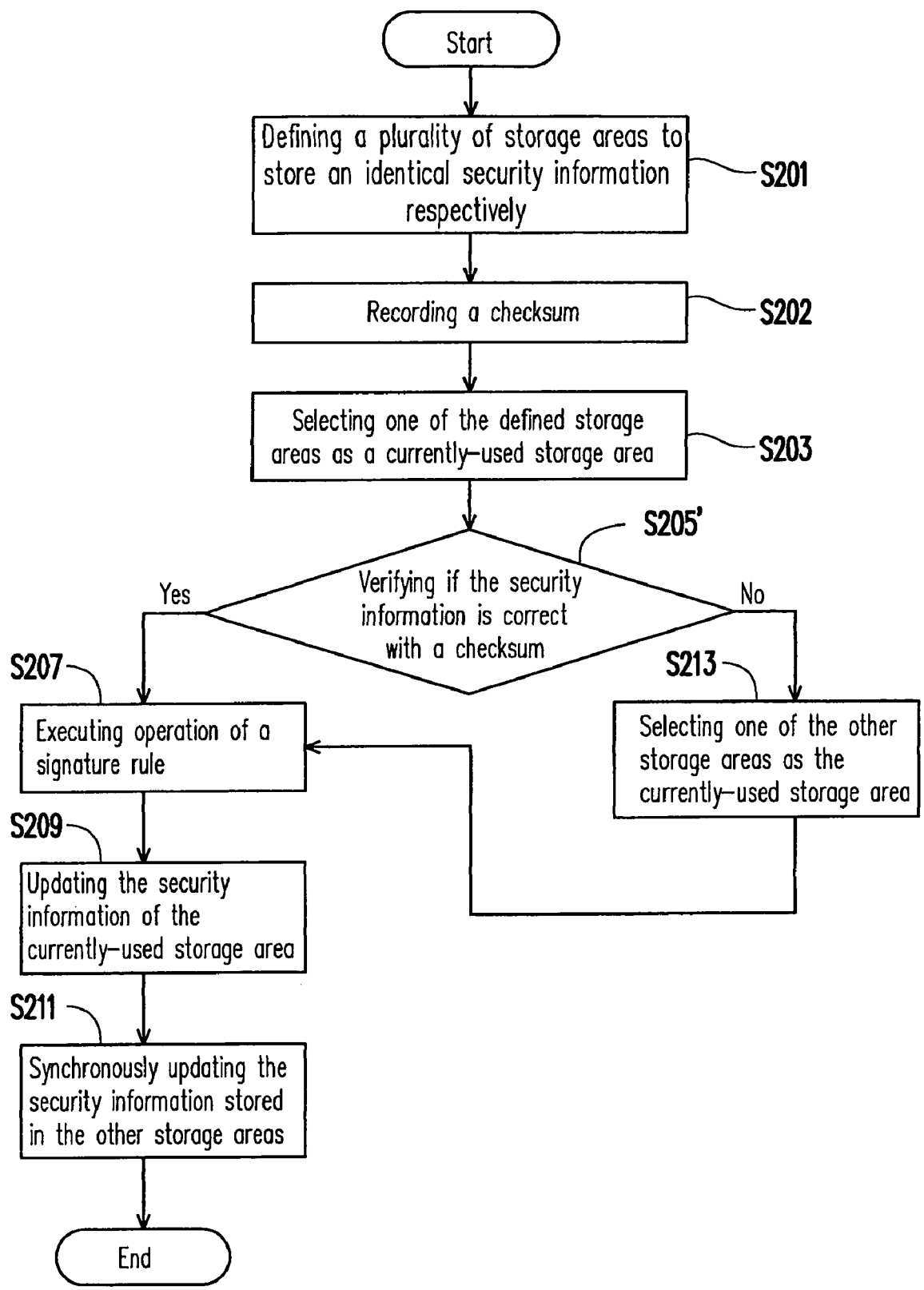
FIG. 3 is a flowchart illustrating an anti-attacking method for a private key according to another embodiment of the present invention.

In the present embodiment, whether a storage area is under attack is determined by comparing the security information of all the storage areas. According to another embodiment of the present invention, a checksum or a hash may also be used to check the security information in the storage areas to detect the attack. FIG. 3 is a flowchart illustrating an anti-attacking method for a private key according to another embodiment of the present invention. Referring to FIG. 3, the anti-attacking method in FIG. 3 further includes recording a checksum (a step S202) and verifying whether the security information is correct with a checksum in a step S205' so as to replace the step S205 of FIG. 2 in detecting the attack.

In the present embodiment, the currently-used storage area for storing the security information is changed when an attack occurs. According to another embodiment of the present invention, besides changing the storage area when an attack occurs, a step S211 further includes selecting another of the other storage areas as the currently-used storage area whenever the security information of the storage areas is updated. Since the currently-used storage area for storing the security information is changed more frequently, it is more difficult for the attacker to tamper the security information.

In the present embodiment, the currently-used storage area is selected at random. However, it is to be understood that the present invention is not limited to this. For example, the currently-used storage area may also be selected in a certain sequence.

It should be noted that in the present embodiment, two storage areas are used to store the security information synchronously. Nevertheless, it must be understood that the present invention is not limited to this. In consideration of resources of the buffer memory 160b, more storage areas may also be used to implement the present invention.

Moreover, according to another embodiment of the present invention, the anti-attacking method further includes ceasing operation of the signature rule when all the storage areas are detected as under attack. Therefore, whatever the value of the private key is, no result is outputted and the attack cannot infer the value of the private key. A method of detecting whether all of the storage areas are attacked may be recording and checking the checksum or the hash.

It is understood that the present invention is not limited to the steps illustrated in FIGS. 2 and 3. In other words, the foregoing steps are not necessarily executed as described above for the purposes of present invention to be fulfilled.

To more specifically describe the spirit of the present invention, implementation of the present invention is exemplified by the RSA signature rule in the following.

As described in the prior art, RSA is one type of asymmetrical cryptosystem, developed by three professors in the Massachusetts Institute of Technology (MIT), Rivest, Shamir and Adleman (hence, RSA), in 1978. The present invention is exemplified by a plurality of RSA rules for further explanation.

Example 1

| | |
|---|---|
| 0.1 | Input : M, K, N |
| 0.2 | Output : R = $M^K$ mod N |
| 0.3 | R = 1, B = M |
| 0.4 | for i = 0 to length (K)−1, |
| 0.5 |   if ($K_i$ == 1) R = RB mod N |

-continued

| | |
|---|---|
| 0.6 |   B = $B^2$ mod N |
| 0.7 | end for |

The foregoing Rule 1 has been described in the prior art and is therefore not to be reiterated herein. Accordingly, an attacker intending to steal the RSA private key may perform a fault attack on R of Formula (0.5) or on B of Formula (0.6) to steal the private key. In other words, the attacker may tamper a value of R or B during an operation process to guess the RSA private key K.

To solve the problem that the RSA private key might be cracked, the anti-attacking method (as illustrated in FIGS. 2 and 3) of the RSA private key provided in the embodiment of the present invention can be applied in Rule 1 to effectively prevent the RSA private key from being stolen. How the anti-attacking method as illustrated in FIG. 2 is applied to the RSA signature rule is described in detail in the following. An RSA Rule 1' having the anti-attacking method:

| | |
|---|---|
| 2.1 | Input : M, K, N |
| 2.2 | Output : R = $M^K$ mod N |
| 2.3 | Buffer : $S_0$, $S_1$ |
| 2.4 | $S_0 = S_1 = 1$, B = M, p = 0, R points to $S_p$ |
| 2.5 | for i = 0 to length (K)−1, |
| 2.6 |   if ($K_i$ == 1), |
| 2.7 |     R = RB mod N |
| 2.8 |     Synchronize_MB(& R, & p) |
| 2.9 |   end if |
| 2.10 |   B = $B^2$ mod N |
| 2.11 |   if ($S_0 \neq S_1$)    Remedy_MB(& R, & p) |
| 2.12 | end for |

Sub-routine Synchronize_MB(\*R, \*p) {
  $S_{(*p+1) mod 2}$ = \*R
  \* p = (\* p+1)mod 2
  R = &$S_p$    // R point to $S_p$
}
Sub-routine Remedy_MB(\*R, \*p) {
  $S_{(*p+1) mod 2}$ = $S_{*p}$
  \* p = (\* p+1)mod 2
  R = &$S_p$
}

Difference between RSA Rule 1' and RSA Rule 1 lies in that RSA Rule 1' defines storage areas $S_0$ and $S_1$ to store a security information R in Formula (2.3) (the step S201), and in Formula (2.4), one of the defined storage areas is selected as a currently-used storage area (the step S203). Furthermore, after modulus multiplication is performed in Formula (2.7), the security information of the storage areas $S_0$ and $S_1$ is synchronously updated (i.e., Synchronize_MB(\*R, \*p)) in Formula (2.8) (a step S211). Additionally, in Formula (2.11), it is determined whether the security information stored in the currently-used storage area is identical to that of another storage area (the step S205). When the two pieces of security information are not identical to each other (that is, the currently-used storage area being attacked), another storage area is selected as the currently-used storage area (the step S213) and the security information of the another storage area is duplicated to the storage area which is attacked (i.e., Remedy_MB(\*R, \*p)).

It is known from Formulae (2.6)-(2.9) that when an attack occurs, if the private key $K_i$=1, $S_0$ is equivalent to $S_1$ and the final security information is also correct. If $K_i$=0, Formula (2.11) would detect $S_0$ and $S_1$ as not equivalent to each other and a security information R of another storage area is computed instead. In other words, the storage area which is attacked will be corrected so that the final security information R is also correct.

In the general prevention mechanism, when an attack occurs, the outputted result is blocked and the RSA public key is used to renew computation and comparison in the final result so as to detect the attack. Such method can detect an attack but cannot resist the attack. When an attack is detected, generally an output of the result is ceased, which also informs the attacker that the attack has obtained an erroneous computation result and thereby the attack can infer $K_i=0$. However, in the present embodiment, when under attack, whether $K_i=0$ or $K_i=1$, a final correct computation result is obtained. Hence, the attacker cannot infer the private key K.

Moreover, in Formulae (2.6)-(2.9) and (2.11), a detecting mechanism to determine whether all the storage areas $S_0$ and $S_1$ are attacked may also be added. When all the storage areas $S_0$ and $S_1$ are attacked, whether $K_i=0$ or $K_i=1$, no result is outputted so that the attacker is prevented from inferring the value of the private key.

Example 2

The private key K in Example 1 is read from right to left. In the present example, the private key K is read from left to right. An RSA Rule 2:

```
3.1  Input : M, K, N
3.2  Output : R = M^K mod N
3.3  R = 1
3.4  for i = length (K)−1 downto 0,
3.5     R = R^2 mod N
3.6     if (K_i == 1) R = RM mod N
3.7  end for
```

All input and output values in RSA Rule 2 are identical to those in Rule 1 and thus are not to be reiterated herein. RSA Rule 2 and RSA Rule 1 read the private key K in different sequences, and thus Formulae (3.4)-(3.7) are executed in slightly different sequences. However, RSA Rules 1 and 2 are substantially the same. Hence, similar to RSA Rule 1, RSA Rule 2 also has a risk of the private key being stolen. To solve the problem, the anti-attacking method as illustrated in FIG. 2 can be applied in RSA Rule 2, expressed as RSA Rule 2':

```
4.1   Input : M, K, N
4.2   Output : R = M^K mod N
4.3   Buffer : S_0, S_1
4.4   S_0 = S_1 = 1, p = 0, R point to S_p
4.5   for i = length (K)−1 downto 0,
4.6      R = R^2 mod N
4.7      Synchronize__MB(& R, & p)
4.8      if (K_i == 1),
4.9         R = RM mod N
4.10        Synchronize__MB(& R, & p)
4.11     end if
4.12     if (S_0 ≠ S_1)   Remedy__MB(& R, & p)
4.13  end if
```

Difference between RSA Rule 2' and RSA Rule 2 lies in that RSA Rule 2' defines storage areas $S_0$ and $S_1$ to store a security information R in Formula (4.3) (the step S201), and in Formula (4.4), one of the defined storage areas is selected as a currently-used storage area (the step S203). Furthermore, after modulus multiplication is performed in Formulae (4.6) and (4.9), the security information of the storage areas $S_0$ and $S_1$ is synchronously updated in Formula (4.7) and (4.10) respectively (the step S211). Additionally, in Formula (4.12), it is determined whether the security information stored in the currently-used storage area is identical to that of another storage area (the step S205). When the two pieces of security information are not identical to each other (i.e., the currently-used storage area being attacked), another storage area is selected as the currently-used storage area (the step S213) and the security information of the another storage area is duplicated to the storage area which is attacked.

Similarly, in Formulae (4.6)-(4.11) and (4.12), a detecting mechanism to determine whether all the storage areas $S_0$ and $S_1$ are attacked may also be added. When all the storage areas $S_0$ and $S_1$ are attacked, whether $K_i=0$ or $K_i=1$, no result is outputted so as to prevent the attacker from inferring the value of the private key.

Example 3

Both Example 1 and Example 2 exemplify the implementation and efficacy of the embodiments of the present invention with a fault attack (tampering the security information to guess the private key). As to the RSA signature rule, besides fault attacks, time attacks are also rather common. Referring to RSA Rule 1, performing modulus multiplication in Formula (0.5) when the private key $K_i=1$ takes more time than when $K_i=0$. Therefore, generally, when the private key $K_i=1$, it performs longer than when the private key $K_i=0$. Accordingly, an attacker intending to steal the private key may determine the private key K by measuring the time periods of both private keys. In order to avoid such time attacks, generally, RSA Rule 1 is changed into an RSA Rule 3:

```
5.1  Input : M, K, N
5.2  Output : R = M^K mod N
5.3  R = 1, B = M
5.4  for i = 0 to length (K)−1,
5.5     y = RB mod N
5.6     if (K_i ==1) R = y
5.7     B = B^2 mod N
5.8  end for
```

In RSA Rule 3, execution of the private key $K_i=1$ and execution of the private key $K_i=0$ is only different in execution of a formula (5.6), and the formula (5.6) only performs moving information in the memory and therefore takes a very short period of time. Execution of the private key $K_i=1$ and execution of the private key $K_i=0$ require substantially the same amount of time. Similar to RSA Rule 1, RSA Rule 3 also has a risk of the private key K being stolen (from attacking the security information R and B). Furthermore, in RSA Rule 3, a security information y is added. For the attacker, there is one more place to attack besides the security information R and B.

To solve the problem, the anti-attacking method as illustrated in FIG. 2 may be applied in an RSA Rule 3 as an RSA Rule 3':

```
6.1   Input : M, K, N
6.2   Output : R = M^K mod N
6.3   Buffer: S_0, S_1
6.4   R = 1, B = M, p = 0, y point to S_p
6.5   for i = 0 to length (K)−1,
6.6      y = RB mod N
6.7      Synchronize__MB(& y, & p)
6.8      if (K_i ==1),
6.9         if (S_0 ≠ S_1)   Remedy__MB(& y, & p)
6.10        R = y
6.11     end if
6.12     B = B^2 mod N
6.13  end for
```

Difference between RSA Rule 3' and RSA Rule 3 lies in that RSA Rule 3' defines storage areas $S_0$ and $S_1$ to store a security information R in Formula (6.3) (the step S201), and in Formula (6.4), one of the defined storage areas is selected as a currently-used storage area (the step S203). Furthermore, after modulus multiplication is performed in Formula (6.6), the security information of the storage areas $S_0$ and $S_1$ is synchronously updated in Formula (6.7) (the step S211). Additionally, in Formula (6.9), it is determined whether the security information stored in the currently-used storage area is identical to that of another storage area (the step S205). When the two pieces of security information are not identical to each other (i.e., the currently-used storage area being attacked), another storage area is selected as the currently-used storage area (the step S213) and the security information of the another storage area is duplicated to the storage area under attack.

Similarly, in Formulae (6.5)-(6.12), a detecting mechanism to determine whether all the storage areas $S_0$ and $S_1$ are attacked may also be added. When all the storage areas $S_0$ and $S_1$ are attacked, whether $K_i=0$ or $K_i=1$, no result is outputted so that the attacker is prevented from inferring the value of the private key.

Example 4

Likewise, to avoid time attacks, generally RSA Rule 2 is changed into an RSA Rule 4. A concept of such a change is similar to RSA Rule 3 and therefore is not to be reiterated herein. RSA Rule 4:

```
7.1   Input : M, K, N
7.2   Output : R = M^K mod N
7.3   R = 1
7.4   for i = length (K)−1 downto 0,
7.5       y_0 = R^2 mod N
7.6       y_1 = y_0 M mod N
7.7       if (K_i ==1) R = y_1
7.8       else R = y_0
7.9   end for
```

However, RSA Rule 4 is substantially identical to RSA Rule 3. Therefore, besides the two pieces of security information R and B, RSA Rule 4 also includes attack points of $y_0$ and $y_1$. To solve the problem, the anti-attacking method as illustrated in FIG. 2 may be applied in RSA Rule 4 as an RSA Rule 4':

```
8.1    Input : M, K, N
8.2    Output : R = M^K mod N
8.3    Buffer : S_0, S_1
8.4    R = 1, p = 0, y_1 point to S_p
8.5    for i = length (K)−1 downto 0,
8.6        y_0 = R^2 mod N
8.7        y_1 = y_0 M mod N
8.8        Synchronize_MB(& y_1, & p)
8.9        if (K_i ==1) {
8.10           if (s_0 ≠ S_1)   Remedy_MB(& y_1, & p)
8.11           R = y_1
8.12       } else R = y_0
8.13   end for
```

Difference between RSA Rule 4' and RSA Rule 4 lies in that RSA Rule 4' defines storage areas $S_0$ and $S_1$ to store a security information R in Formula (8.3) (the step S201), and in Formula (8.4), one of the defined storage areas is selected as a currently-used storage area (the step S203). Furthermore, after modulus multiplication is performed in Formulae (8.6) and (8.7), the security information of the storage areas $S_0$ and $S_1$ is synchronously updated in Formula (8.8) (the step S211). Additionally, in Formula (8.10), it is determined whether the security information stored in the currently-used storage area is identical to that of another storage area (the step S205). When the two pieces of security information are not identical to each other (i.e., the currently-used storage area being attacked), another storage area is selected as the currently-used storage area (the step S213) and the security information of the another storage area is duplicated to the storage area under attack.

Similarly, in Formulae (8.6)-(8.11), a detecting mechanism to determine whether all the storage areas $S_0$ and $S_1$ are attacked may also be added. When all the storage areas $S_0$ and $S_1$ are attacked, whether $K_i=0$ or $K_i=1$, no result is outputted so that the attacker is prevented from inferring the value of the private key.

All the foregoing examples exemplify protection of the security information R. However, it is understood that in the foregoing RSA rules, all the security information B, y, $y_0$ and $y_1$ may be protected by the storage areas $S_0$ and $S_1$.

A plurality of RSA rules is implemented by the embodiment illustrated in FIG. 2 as described above. Nevertheless, FIG. 3 may also be implemented similarly as the aforementioned.

Examples of the foregoing RSA signature rules are cited to illustrate implementation of the embodiments of the present invention. The point is to exemplify that the present invention may be applied in the RSA signature rules and other similar signature rules. In other words, the present invention is not limited to specific signature rules.

The anti-attacking method for the private key may be implemented as a computer readable code on a computer readable recording medium. The computer readable recording medium may be any data storage device to be read by a computer system subsequently. Examples of the computer readable recording medium include a read-only memory (ROM), a random-access memory (RAM), a CD-ROM, a magnetic tape, a floppy disk, an optical data storage device and a carrier wave (such as data transmission through the internet).

In summary, in the anti-attacking method provided by the present invention, a plurality of storage areas is used to store the value of the security information (such as the aforementioned security information R and B). During execution of the signature rule, when the security information is used (i.e., reading and writing), only one of the storage areas is used. At a specific point of time, all the storage areas are compared to see if they are identical to each other. If any of the storage areas is found different from the others, the storage area is replaced with the other storage areas not under attack. As a result, the attacker cannot obtain any message of the private key from the computation result and thereby enhancing the safety of the signature rule.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An anti-attacking method for a private key, comprising:
   using a plurality of storage areas of a memory storage device to store identical security information respectively;

when applying a signature rule and the private key to generate a digital signature, selecting one of the storage areas as a currently-used storage area and accessing the security information from the currently-used storage area;

when detecting the security information of the currently-used storage area is attacked during the generation of the digital signature, selecting another of the other storage areas as the currently-used storage area so as to provide the correct security information, updating the security information in the currently-used storage area and synchronously updating the security information stored in the other storage areas based on the security information stored in the currently-used storage area;

when detecting the security information of the currently-used storage area is non-attacked during the generation of the digital signature, updating the security information in the currently-used storage area, synchronously updating the security information stored in the other storage areas based on the security information stored in the currently-used storage area and selecting another storage area among the other storage areas as the currently-used storage area.

2. The anti-attacking method for the private key as claimed in claim 1, wherein the signature rule is an RSA signature rule and the private key is an RSA private key.

3. The anti-attacking method for the private key as claimed in claim 1, wherein detecting the attack comprises comparing the security information of the currently-used storage area and the security information of the other storage areas.

4. The anti-attacking method for the private key as claimed in claim 1, further comprising recording a checksum or a hash in the storage areas to detect the attack.

5. The anti-attacking method for the private key as claimed in claim 1, wherein the currently-used storage area is selected at random.

6. The anti-attacking method for the private key as claimed in claim 1, wherein a number of the storage areas is two.

7. The anti-attacking method for the private key as claimed in claim 1, further comprising duplicating the security information of another storage area to the storage area which is attacked when the attack is detected.

8. The anti-attacking method for the private key as claimed in claim 1, further comprising ceasing operation of the signature rule when all the storage areas are attacked.

9. A controller controlling a non volatile a non-volatile memory of a storage device, the controller comprising:
a non-volatile memory interface, for accessing the non-volatile memory;
a buffer memory, for storing data temporarily;
and a microprocessor unit, electrically connected to the non-volatile memory interface and the buffer memory for using a plurality of storage areas to store an identical security information respectively,
wherein when applying a signature rule and the private key to generate a digital signature, the microprocessor unit selects one of the storage areas as a currently-used storage area and accesses the security information from the currently-used storage area,
wherein when detecting the security information of the currently-used storage area is attacked during the generation of the digital signature, the microprocessor unit selects another storage area among the other storage areas as the currently-used storage area so as to provide the correct security information, updates the updated security information in the currently-used storage area and synchronously updates the security information stored in the other storage areas based on e the security information stored in the currently-used storage area, and
wherein when detecting the security information of the currently-used storage area is non-attacked during the generation of the digital signature, the microprocessor unit updates the security information in the currently-used storage area, synchronously updates the security information stored in the other storage areas based on the security information stored in the currently-used storage area and selects another storage area among the other storage areas as the currently-used storage area.

10. The controller as claimed in claim 9, wherein the signature rule is an RSA signature rule and the private key is an RSA private key.

11. The controller as claimed in claim 9, wherein the microprocessor unit compares the security information of the currently-used storage area and the security information of the other storage areas for detecting the attack.

12. The controller as claimed in claim 9, wherein the microprocessor unit further records a checksum or a hash in the storage areas to detect the attack.

13. The controller as claimed in claim 9, wherein the microprocessor unit selects the currently-used storage area at random.

14. The controller as claimed in claim 9, wherein the microprocessor unit ceases operation of the signature rule when all the storage areas are attacked.

15. The controller as claimed in claim 9, wherein the storage device is a flash memory storage medium, a USB flash disk, a flash memory card, a solid hard disk drive or a smart card.

16. The controller as claimed in claim 9, wherein the non-volatile memory is a single-level cell (SLC) or a multi-level cell (MLC) NAND flash memory.

17. A storage device, comprising:
a non-volatile memory, used for storing data;
a controller, electrically connected to the non-volatile memory, the controller comprising:
a non-volatile memory interface, for accessing a non-volatile memory;
a buffer memory, for storing data temporarily; and a microprocessor unit, for using a plurality of storage areas to store an identical security information respectively; and
a data transmission interface, electrically connected to the controller for communicating with a host,
wherein when applying a signature rule and the private key to generate a digital signature, the microprocessor unit selects one of the storage areas as a currently-used storage area and accesses the security information,
wherein when detecting the security information of the currently-used storage area is attacked during the generation of the digital signature, the microprocessor unit selects another storage area among the other storage areas as the currently-used storage area so as to provide the correct security information and updates the updated security information in the currently-used storage area and synchronously updates the security information stored in the other storage areas based on the security information stored in the currently-used storage area,
wherein when detecting the security information of the currently-used storage area is non-attacked during the generation of the digital signature, the microprocessor unit updates the security information in the currently-used storage area, synchronously updates the security information stored in the other storage areas based on the security information stored in the currently-used storage area and selects another storage area among the other storage areas as the currently-used storage area.

18. The storage device as claimed in claim 17, wherein the non-volatile memory comprises a catalogue area, a secret area and a data area, wherein the private key is stored in the secret area.

19. The storage device as claimed in claim 17 wherein the microprocessor unit compares the security information of the currently-used storage area and the security information of the other storage areas for detecting the attack.

20. The storage device as claimed in claim 17, wherein the microprocessor unit further records a checksum or a hash in the storage areas to detect the attack.

21. The storage device as claimed in claim 17, wherein the non-volatile memory is a single-level cell (SLC) or a multi-level cell (MLC) NAND flash memory.

* * * * *